United States Patent [19]

Huy et al.

[11] Patent Number: 4,935,455
[45] Date of Patent: Jun. 19, 1990

[54] ULTRAVIOLET-CURABLE SILICONE RESIN COMPOSITION FOR USE IN COATING OPTICAL FIBERS

[75] Inventors: Sam Huy, Tokyo; Yasuji Matsumoto, Gunma, both of Japan

[73] Assignee: Toshiba Silicone Co., Ltd., Tokyo, Japan

[21] Appl. No.: 349,674

[22] Filed: May 10, 1989

[30] Foreign Application Priority Data

May 12, 1988 [JP] Japan .................. 63-115493

[51] Int. Cl.$^5$ .................................. C08G 77/20
[52] U.S. Cl. ........................... 522/99; 522/83; 528/30; 528/32; 524/860
[58] Field of Search .............................. 522/99

[56] References Cited

U.S. PATENT DOCUMENTS

| | | | |
|---|---|---|---|
| 3,816,282 | 6/1974 | Viventi | 522/60 |
| 4,608,312 | 8/1986 | Eckberg et al. | 522/99 |
| 4,611,042 | 9/1986 | Rivers-Farrell et al. | 522/99 |
| 4,660,927 | 4/1987 | Kondow et al. | 428/391 |
| 4,707,503 | 11/1987 | Itoh et al. | 522/99 |

FOREIGN PATENT DOCUMENTS 0141380  5/1985  European Pat. Off. .

Primary Examiner—John C. Bleutge
Assistant Examiner—Susan Berman
Attorney, Agent, or Firm—Sughrue, Mion, Zinn, Macpeak & Seas

[57] ABSTRACT

An ultraviolet-curable silicone resin composition for use in coating optical fibers, which comprises (A) 100 parts by weight of a vinyl group-containing flowable organopolysiloxane represented by the average composition formula,

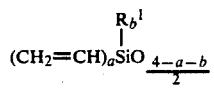

wherein $R^1$ represents a substituted or unsubstituted monovalent hydrocarbon group excluding a vinyl group, and a and b are numbers defined by the formulae $0.01 \leq a \leq 1$, $0.8 \leq b < 3$ and $1.8 \leq a+b \leq 2.2$, and having a viscosity as measured at 25° C. of from 50 to 10,000 cP;

(B) 30 to 300 parts by weight of a vinyl group-containing organopolysiloxane resin comprising units represented by $R^2{}_3SiO_{0.5}$, units represented by $(CH_2=CH)_cR^3{}_{2-c}SiO$ wherein $R^2$ and $R^3$ each independently represents a substituted or unsubstituted monovalent hydrocarbon group excluding a vinyl group, and c is 0, 1 or 2, and units represented by $SiO_2$,
the molar ratio of the sum of the $R^2{}_3SiO_{0.5}$ units and the $SiO_2$ units to the $(CH_2=CH)_cR_{32-c}SiO$ units being in the range of from 3 to 20, the content of a vinyl group in component (B) being 1 to 25 mol %;

(C) 10 to 100 parts by weight of a mercaptoalkyl group-containing organopolysiloxane comprising units represented by $R^2{}_3SiO_{0.5}$, units represented by

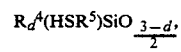

and units represented by $R^6{}_{2-e}R^7{}_eSiO$ wherein $R^2$, $R^4$, $R^6$ and $R^7$ each independently represents a substituted or unsubstituted monovalent hydrocarbon group excluding a vinyl group, $R^5$ represents a divalent hydrocarbon group having 2 to 6 carbon atoms, d is 0, 1 or 2, and e is 0, 1 or 2,
the molar ratio of the sum of the $R^2{}_3SiO_{0.5}$ units and the

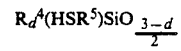

units to the $R^6{}_{2-e}R^7{}_eSiO$ units being in the range of from 0.05 to 0.5, the content of the SH group in component (C) being 4 to 30 mol %;

(D) 0.01 to 50 parts by weight of a photopolymerization initiator;
(E) 0.001 to 10 parts by weight of a polymerization inhibitor;
(F) 0.001 to 10 parts by weight of an antioxidant; and
(G) 0.001 to 10 parts be weight of an ultraviolet absorber,
the molar ratio of the mercaptoalkyl groups in component (C) to the vinyl group in both components (A) and (B) being in the range of from 0.2 to 2.5.

8 Claims, No Drawings

ULTRAVIOLET-CURABLE SILICONE RESIN COMPOSITION FOR USE IN COATING OPTICAL FIBERS

FIELD OF THE INVENTION

This invention relates to an ultraviolet-curable silicone resin composition for use in coating optical fibers. More particularly, the present invention is concerned with a mercaptoalkyl group-containing organopolysiloxane composition which cures quickly upon exposure to ultraviolet rays, thereby improving the efficiency of optical fiber production, and the resulting cured coatings on optical fibers are free from bleeding because of the good ultraviolet stability of the coatings and show excellent elastic properties over a working range of from an extremely low temperature to a high temperature.

BACKGROUND OF THE INVENTION

Various kinds of fibers for optical communication are known such as the quartz type, multicomponent glass type and plastic type fibers. Of those, the quartz type optical fibers are most widely used from the standpoints of their low loss of optical transmission, transmitting capacity, heat resistance, weatherability, and high reliability. However, the quartz type optical fibers are disadvantageous in that the fibers will grate fine surface defects and the properties of the fibers will change with the lapse of time. In order to overcome those problems, the surface of quartz-type optical fibers is primarily coated with a silicone resin and then a finish coating is applied thereon. The reasons why a silicone resin has been selected as the primary coating are mainly as follows: (1) the silicone resin has a reinforcing effect against the quartz fibers so that the reinforced fibers can exhibit a strength substantially the same as the theoretical value; and (2) the silicone resin shows stable physical properties which vary little over a wide temperature range, and particularly the Young's modulus changes little at low temperatures, and hence the silicone resin is useful for stress relaxation, so that the increase in transmission loss due to microbending and the adverse effect of scattering on noise levels can be minimized. As a silicone resin for this use, an addition reaction-curable liquid silicone has so far been used, which cures upon heating. However, rationalization of the coating process has reached its limit in view of the low curing rate and production efficiency, even where a high-temperature heating chamber is used. Further, use of this addition reaction-curable silicone has newly caused a serious problem that an organopolysiloxane used as a crosslinking agent, which contains hydrogen atoms bonded to silicon atoms (i.e., which has Si-H bonds) generates hydrogen gas, and the gas adversely affects the transmission characteristics of the quartz glass fibers.

Under those circumstances, attention is now focused on ultraviolet-curable silicone resins. JP-A-58-187902 discloses a coated optical fiber prepared by applying on an optical fiber a composition comprising a polysiloxane having a carbon-carbon double bond in the molecule, and a polymerization initiator and/or an organic compound having an SH group, and then curing the applied composition by ultraviolet irradiation. (The term "JP-A" as used herein means an "unexamined published Japanese patent application.) JP-A-58-204845 discloses a process for preparing a glass fiber for optical transmission, which process includes use of a composition comprising the above-described polysiloxane, a photosensitizer, and an SH group-containing organopolysiloxane. However, the two compositions described above have disadvantages of an offensive odor and poor stability.

Compositions similar to the above ones are described in JP-A-59-35044 and JP-A-59-88344. There is a description therein that an antioxidant may be incorporated as an optional component from the standpoint of the insufficient stability of the above-described compositions. Although improved to some extent by the optional component, the stability of those compositions is still insufficient when they are used for coating optical fibers.

JP-A-60-110752 discloses a composition comprising an alkenyl group-containing linear diorganopolysiloxane, a mercapto-functional organopolysiloxane, a photosensitizer, a viscosity stabilizer and a reinforcing agent. This composition shows an improved curing rate and gives a cured resin having improved strength, but the stability of the composition and the heat resistance of the cured resin are still insufficient.

JP-A-62-79265 discloses a composition comprising a mercaptosiloxane unit-containing organopolysiloxane, an unsaturated group-containing organopolysiloxane, benzophenone, and a second initiator. However, this composition is not suitable for application to optical fibers since it is difficult to obtain transparency of the composition.

Further, JP-A-62-161856 discloses a composition comprising an alkenyl group-containing organopolysiloxane, a mercaptoalkyl group-containing silicone resin, a mercaptoalkyl group-containing diorganopolysiloxane, and a photosensitizer. This composition gives a cured resin having improved strength and low-temperature properties, but the heat resistance and weatherability of the cured resin are insufficient to some extent.

As described above, the conventional compositions have the following disadvantages: the storage stability of the compositions before curing is poor; the photosensitivities of the compositions are so low that they cure only when the radiation energy is more than several hundred mJ/cm$^2$; the high-speed wire-drawing properties of compositions are poor; and cured resins coated on fibers deteriorate due to ultraviolet rays, causing an oily substance to bleed out from the surfaces, whereby the application of nylon coatings on the resulting surfaces to form nylon jackets cannot be performed uniformly. Further, since the heat resistance of the compositions which have so far been proposed is not so good as compared with other general-purpose organic materials, the heat life of optical fibers has become a serious problem.

SUMMARY OF THE INVENTION

The present inventors have conducted intensive studies to develop a composition which can overcome the problems of the conventional compositions. As a result, they have found that an optical fiber coating obtained by coating a specific composition as described below on optical fibers and then irradiating the applied composition with ultraviolet rays to cure the composition has excellent properties necessary for optical fiber coatings. This invention has been completed based on this finding.

Accordingly, an object of the present invention is to provide an ultraviolet-curable silicone resin composition for use in coating optical fibers, which cures quickly upon exposure to ultraviolet rays to give cured coatings free from bleeding due to their good ultraviolet resistance and having greatly improved heat resistance, thus eliminating the above-described disadvantages of the conventional compositions.

DETAILED DESCRIPTION OF THE INVENTION

The ultraviolet-curable silicone resin composition for use in coating optical fibers according to the present invention comprises (A) 100 parts by weight of vinyl group-containing flowable organopolysiloxane represented by the average composition formula,

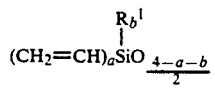

wherein $R^1$ represents a substituted or unsubstituted monovalent hydrocarbon group excluding a vinyl group and a and b are numbers defined by the formulae $0.01 \leq a \leq 1$, $0.8 \leq b < 3$ and $1.8 \leq a+b \leq 2.2$, and having a viscosity as measured at 25° C. of from 50 to 10,000 cP;

(B) 30 to 300 parts by weight of a vinyl group-containing organopolysiloxane resin comprising units represented by $R^2{}_3SiO_{0.5}$, units represented by $(CH_2=CH)_cR^3{}_{2-c}SiO$ wherein $R^2$ and $R^3$ each independently represent a substituted or unsubstituted monovalent hydrocarbon group excluding a vinyl group, and c is 0, 1 or 2, and units represented by $SiO_2$, the molar ratio of the sum of the $R^2{}_3SiO_{0.5}$ units and $SiO_2$ units to the $(CH_2=CH)_cR^3{}_{2-c}SiO$ units being in the range of from 3 to 20, and the content of a vinyl group in component (B) being 1 to 25 mol %;

(C) 10 to 100 parts by weight of a mercaptoalkyl group-containing organopolysiloxane comprising units represented by $R^2{}_3SiO_{0.5}$, units represented by

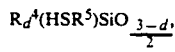

and units represented by $R^6{}_{2-e}R^7{}_eSiO$ wherein $R^2$, $R^4$, $R^6$ and $R^7$ each independently represent a substituted or unsubstituted monovalent hydrocarbon group excluding a vinyl group, $R^5$ represents a divalent hydrocarbon group having 2 to 6 carbon atoms, d is 0, 1 or 2, and e is 0, 1 or 2, the molar ratio of the sum of the $R^2{}_3SiO_{0.5}$ units and

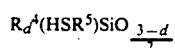

units to the $R^6{}_{2-e}R^7{}_eSiO$ units being in the range of from 0.05 to 0.5, and the content of an SH group in component (C) being 4 to 30 mol %;

(D) 0.01 to 50 parts by weight of a photopolymerization initiator;

(E) 0.001 to 10 parts by weight of a polymerization inhibitor;

(F) 0.001 to 10 parts by weight of an antioxidant; and (G) 0.001 to 10 parts by weight of an ultraviolet absorber, the molar ratio of the mercaptoalkyl groups in component (C) to the vinyl groups in both components (A) and (B) being in the range of from 0.2 to 2.5.

Component (A) in the composition of this invention is a flowable organopolysiloxane represented by the above-described average composition formula. In the formula, $R^1$ represents a substituted or unsubstituted monovalent hydrocarbon group excluding a vinyl group. Examples of $R^1$ include an alkyl group such as methyl, ethyl, propyl, butyl, isobutyl, amyl, hexyl or octadecyl; an alkenyl group such as allyl or cyclohexenyl; a cycloalkyl group such as cyclopentyl or cyclohexyl; an aryl group such as phenyl or naphtyl; an aralkyl group such as benzyl or β-phenylethyl; an alkaryl group such as tolyl, xylyl or mesityl; and groups which are the same as the above-described groups except that the hydrogen atoms thereof have been partly or wholly substituted with a halogen atom or atoms or others, such as a 3,3,3-trifluoropropyl group, a 3-chloropropyl group, a chloromethyl group, a chlorophenyl group and a dibromophenyl group.

In the present invention, it is preferred that all of the groups represented by $R^1$, i.e., substituted or unsubstituted monovalent hydrocarbon groups excluding vinyl groups, which are bonded to silicon atoms, are either methyl or a combination of methyl and phenyl groups. In the case where the groups represented by $R^1$ consists of methyl groups and phenyl groups, the number of phenyl groups per silicon atom is in the range of from 0.0001 to 0.2, preferably from 0.002 to 0.15.

The reasons for this are that too large a proportion of phenyl groups impairs the light transmission of the resulting composition, whereby it is difficult to obtain cured coatings with relatively large thickness, although the incorporation of a phenyl group serves to greatly reduce the time required for photo-curing, especially when applied coatings of the composition are thin.

In component (A), the number a of vinyl groups per silicon atom should be $0.01 \leq a \leq 1$, as described before. If the number a is smaller than 0.01, the curability of the resulting composition is insufficient, while numbers exceeding 1 are also disadvantageous in that not only sufficient effects cannot be obtained, but also the mechanical properties and heat resistance of cured coatings are adversely affected. Further, the number b of hydrocarbon groups excluding vinyl groups should be $0.8 < b < 3$, as described hereinbefore. It is particularly preferred that the number of vinyl groups is not larger than 50% of the total number of all the organic groups.

The viscosity of component (A) as measured at 25° C. should be 50 cP or higher. A viscosity lower than 50 cP is disadvantageous in that the curability of the composition is insufficient and the properties of cured coatings formed from the composition are poor. If the number of vinyl groups is outside the range described above and the viscosity is below 50 cP, not only does the curing of the composition requires more time, but also the cured coatings show poor heat resistance and become brittle. A more preferred proportion of vinyl groups is such that the number of vinyl groups is from 0.02 to 10% of the total number of all the organic groups, from the standpoints of the easy synthesis of component (A) and the heat resistance, flexibility and crosslinking efficiency of cured coatings. Further, the viscosity of component (A) as measured at 25° C. should be in the range of from 50 to 10,000 cP, preferably from 100 to 1,000 cP, because high fluidity is required to improve its productivity. Since component (A) is required to have fluidity, the total number (a+b) of all the organic groups per silicon atom in component (A) should be in the range of $1.8 \leq a+b \leq 2.2$.

The structure of the main chains of component (A) may be any of the straight chain, branched and cyclic types, but practically preferred is the straight chain type. Further, component (A) may be one kind of organopoly siloxane, or a combination of two or more organopolysiloxanes.

Component (B) in the composition of the present invention is a vinyl group-containing organopolysiloxane resin comprising units of the three kinds described herein before. In those units, $R^2$ and $R^3$ have the same meaning as that of the above-described $R^1$ and each represent a monovalent organic group excluding a vinyl group, and c is 0, 1 or 2. In component (B), the proportions of units of the three kinds are such that the molar ratio of the sum of the $R^2{}_3SiO_{0.5}$ units and the $SiO_2$ units to the $(CH_2=CH)_c R^3{}_{2-c}SiO$ units is in the range of from 3 to 20, in order to improve the properties of the composition while retaining its compatibility with component (A). If the molar ratio thereof is below 3, the compatibility of component (B) with other components, the transparency of the resulting composition, and the mechanical strengths of cured coatings formed from the composition are insufficient, while ratios exceeding 20 are also disadvantageous in that the compatibility of component (B) with other components and the heat resistance of cured coatings become very poor. A more preferred range of the molar ratio is from 5 to 15. Further, the content of a vinyl group in component (B) should be in the range of from 1 to 25 mol % in terms of the content of a vinyl group-containing siloxane unit. Component (B) in the composition of the present invention serves to raise the crosslinking efficiency and suppress bleeding after such is coated on optical fibers and cured. Therefore, if the vinyl group content in component (B) is below 1 mol %, a sufficient crosslinking efficiency cannot be obtained, while if it exceeds 25 mol %, cured coatings formed from the composition are deteriorated greatly in heat resistance. The preferred vinyl group content is in the range of from 5 to 20 mol %.

The amount of component (B) in the composition of this invention is in the range of from 30 to 300 parts by weight per 100 parts by weight of component (A). If the amount of component (B) is below 30 parts by weight, a sufficient crosslinking efficiency of the composition cannot be obtained. On the other hand, a composition with a component (B) content larger than 300 parts by weight is also disadvantageous in that the fluidity of the composition and the flexibility of cured coatings obtained from the composition are impaired.

Component (C) in the composition of this invention is an organopolysiloxane containing a mercaptoalkyl group, and is a flowable liquid having a viscosity as measured at 25° C. of 100,000 cP or less. Viscosities higher than 100,000 cP are disadvantageous in that the compatibility of component (C) with other components and the fluidity of the composition are impaired. This component (C) enables the composition of the present invention to be easily crosslinked by ultraviolet irradiation, and further serves to improve the mechanical strengths and bleed resistance of optical fiber coatings formed from the composition, by a synergistic effect of component (C) and the above-described component (B).

Component (C) comprises siloxane units of three kinds as described hereinbefore. In those units, $R^2$ is as defined above; $R^4$, $R^6$ and $R^7$ have the same meaning as $R^1$, i.e., each represent a substituted or unsubstituted hydrocarbon group excluding a vinyl group; $R^5$ represents a divalent hydrocarbon group having 2 to 6 carbon atoms; d is 0, 1 or 2; and e is 0, 1 or 2. Examples of the divalent hydrocarbon group of $R^5$ include ethylene, propylene, trimethylene, tetramethylene, pentamethylene and hexamethylene. Of those, trimethylene is especially preferred from the standpoint of easy availability of raw materials and the properties of cured coatings.

In component (C), the molar ratio of the sum of the $R^2{}_3SiO_{0.5}$ units and the $$R_d{}^4(HSR^5)SiO_{\frac{3-d}{2}}$$

units to the $R^6{}_{2-e}R^7{}_e SiO$ units is in the range of from 0.05 to 0.5, preferably from 0.05 to 0.2 If the ratio is below 0.05, a sufficient crosslinking efficiency cannot be obtained, while ratios exceeding 0.5 are also disadvantageous in that the compatibility of component (C) with other components and the mechanical strengths, ultraviolet resistance and heat resistance of cured coatings formed from the composition are impaired.

The content of an SH group in component (C) is in the range of from 4 to 30 mol % in terms of the content of a mercaptoalkyl group-containing siloxane unit. The preferred content thereof is in the range of from 5 to 20 mol %. If the content thereof is below 4 mol %, component (C) must disadvantageously be used in a large amount in order to increase the crosslinking efficiency, thus impairing the balanced properties of the composition and cured coatings. On the other hand, if the content thereof is higher than 30 mol %, the resulting composition is disadvantageous in that the compatibility of component (C) with other component, the stability of the composition, and the mechanical strengths and heat resistance of the cured coatings become poor.

The amount of component (C) in the composition is in the range of from 10 to 100 parts by weight, preferably from 20 to 60 parts by weight, per 100 parts by weight of component (A). If the amount thereof is below 10 parts by weight, a sufficient crosslinking rate cannot be obtained, while if it exceeds 100 parts by weight, the compatibility of component (C), the transparency of the composition, and the heat resistance of cured coatings become poor.

The molar ratio of the mercaptoalkyl groups in component (C) to the vinyl groups in components (A) and (B) is in the range of from 0.2 to 2.5, preferably from 0.7 to 1.5. If the ratio thereof is outside the range of 0.2 to 2.5, not only can a sufficient crosslinking efficiency not be obtained, but also the balanced properties of the composition and cured coatings are impaired.

Moreover, this component (C) should be compatible with a mixture of component (A) and component (B), and further, in order to impart sufficient quick-curing properties to the composition and sufficient bleed resistance to cured coatings, component (C) should have sufficient sensitivity to ultraviolet rays so that it can be easily cured by ultraviolet radiation of 50 mJ/cm² or lower radiation energy, and in the resulting cured composition, the amount of portions remaining uncured should be 10% or less (the amount being determined by extraction with a solvent). Therefore, the structure of component (C) and the molar ratio of mercaptoalkyl groups to vinyl groups should in particular be carefully selected.

Component (D) in the composition of this invention can be a conventional photopolymerization initiator. However, the photopolymerization initiator should meet the following requirements: (1) it is liquid at around room temperature; (2) it is compatible with the above-described components (A) to (C); (3) it can act as a solvent for each of the components (E), (F) and (G), which will be described later; and (4) it enables the composition to rapidly cure upon exposure to ultraviolet rays.

Therefore, the conventional polymerization initiators which can satisfy the above requirements include, for example, organic peroxides such as t-butyl perbenzoate, t-hexyl perbenzoate, di-t-butyl peroxide, dicumyl peroxide, 2,5-dimethyl-2,5-di-t-butylperoxyhexane and 2,5-dimethyl-2,5-di-t-butylperoxyhexyne-3; and other compounds such as acetophenone, 2,2-diethoxyacetophenone, 2-hydroxy-2-methyl-1-phenylpropan-1-one and 1-(4-isopropylphenyl)-2-hydroxy-2-methylpropan-1-one. Of those, useful photopolymerization initiators are 2-hydroxy-2-methyl-1-phenylpropan-1-one and 1-(4-isopropylphenyl)-2-hydroxy-2-methylpropan-1-one, and 2-hydroxy-2-methyl-1-phenylpropan-1-one is particularly preferred from the standpoints of the curing rate and the balanced properties of the composition and cured coatings. Of course, the above-described photopolymerization initiators may be used alone or in combination of two or more thereof, or they may be used in combination with other sensitizers, etc.

The amount of those photopolymerization initiators in the composition is from 0.01 to 50 parts by weight, preferably from 0.1 to 30 parts by weight, per 100 parts by weight of component (A). If the amount is below 0.01 part by weight, the curing rate is insufficiently low. On the other hand, even if the amount exceeds 50 parts by weight, the curing rate cannot be increased any more, and the heat resistance and bleed resistance of cured coatings formed from the composition are rather adversely affected.

Component (E), polymerization inhibitor, in the composition of this invention is a component necessary to trap the radicals generated during the mixing of the above-described components (A) to (D) or during preservation of the composition so as to prevent occurrence of a chain reaction or a dark reaction. By the use of component (E), the production of the composition is performed easily and the storage stability of the composition is greatly improved. However, the composition should be easily cured by means of ultraviolet irradiation when used for coating optical fibers. For this reason, the polymerization inhibitor is limited in kind. That is, preferred are those having a mild polymerization-inhibiting effect. For example, phenol-type compounds such as p-methoxyphenol and p-t-butylpyrocatechol are used. In preparing the composition, those may be added alone or in combination thereof to other components. Alternatively, component (E) may preferably be added in the form of a solution in component (D) as described hereinbefore.

The amount of component (E) in the composition is from 0.001 to 10 parts by weight, preferably from 0.01 to 6 parts by weight, per 100 parts by weight of component (A). If the amount thereof is below 0.001 part by weight, the stability of the composition is insufficient, while amounts larger than 10 parts by weight are also disadvantageous in that ultraviolet-curing properties are impaired.

Component (F) in the composition of this invention is an antioxidant which serves to prevent yellowing of optical fiber coatings of a cured elastomer obtained from the composition of this invention, and further to improve the heat resistance of the coatings, and at the same time, it helps the above-described component (E) to exhibit its effect. Examples of the antioxidant include monophenol-type antioxidants such as 2,6-di-t-butyl-p-cresol, 2-t-butyl-4-methoxyphenol, 3-t-butyl-4-methoxyphenol and 2,6-di-t-butyl-4-ethylphenol; bisphenol-type antioxidants such as 2,2'-methylene-bis-(4-methyl-6-t-butylphenol), 4,4'-thiobis-(3-methyl-6-t-butylphenol) and 4,4'-butylidene-bis-(3-methyl-6-t-butylphenol); and polymeric phenol-type antioxidants such as 1,1,3-tris-(2-methyl-4-hydroxy-5-t-butylphenyl)butane, 1,3,5-trimethyl-2,4,6-tris(3,5-di-t-butyl-4-hydroxybenzyl)benzene, tetrakis-[methylene-3-(3',5'-di-t-butyl-4'-hydroxyphenyl)propionate]methane, bis[3,3'-bis-(4'-hydroxy-3'-t-butylphenyl)butyric acid]glycol ester and tocopherol (vitamin E). Of those, tetrakis[methylene-3-(3',5'-di-t-butyl-4'-hydroxyphenyl)propionate]methane (trade name, SUMILIZER BP101; manufactured by Sumitomo Chemical Co., Ltd., Japan) which is of the polymeric phenol type is particularly excellent in non-coloring properties, odorless properties, heat resistance and crosslinking efficiency (low extraction loss). The amount of the antioxidant, component (F), in the composition is from 0.001 to 10 parts by weight, preferably from 0.01 to 6 parts by weight, per 100 parts by weight of component (A). If the amount is below 0.001 part by weight, the non-coloring properties and heat resistance of cured coatings formed from the composition are insufficient, while an amount larger than 10 parts by weight is also disadvantageous in that the compatibility of component (F) with other components is impaired. In preparing the composition, component (F) may be added directly, but it is desirable that component (F) be added in the form of a solution in component (D) as described hereinbefore.

Component (G) in the composition of this invention may be any of the known ultraviolet absorbers of the salicylic acid type, benzophenone type, benzotriazole type and cyanoacrylate type. Examples of the ultraviolet absorbers include salicylic acid-type absorbers such as phenyl salicylate, p-t-butylphenyl salicylate and p-octylphenyl salicylate; benzophenone-type absorbers such as 2,4-dihydroxybenzophenone, 2-hydroxy-4-methoxybenzophenone, 2-hydroxy-4-octoxybenzophenone and 2,2'-dihydroxy-4,4'-dimethoxybenzophenone; benzotriazole-type absorbers such as 2-(2'-hydroxy-5'-methylphenyl)benzotriazole, 2-(2'-hydroxy-5'-t-butylphenyl)benzotriazole, 2-(2'-hydroxy-3',5'-di-t-butylphenyl)benzotriazole and 2-(2'-hydroxy-3',5'-di-t-butylphenyl)-5-chlorobenzotriazole; and cyanoacrylate-type absorbers such as 2-ethylhexyl-2-cyano-3,3'-diphenylacrylate and ethyl-2-cyano-3,3'-diphenylacrylate. Although the incorporation of the ultraviolet absorber is to improve the weatherability of optical fiber coatings, the ultraviolet absorber should not be a material which adversely affects the curing properties and other properties of the composition, and it is further required for the absorber to have a low toxicity. Therefore, particularly preferred of the above-described ultraviolet absorbers are the benzophenone type and benzotriazole type ultraviolet absorbers.

The amount of those ultraviolet absorbers in the composition of this invention is from 0.001 to 10 parts by weight, preferably from 0.01 to 6 parts by weight, per 100 parts by weight of component (A). If the amount thereof is below 0.001 part by weight, the weatherability of the cured coatings becomes insufficient, While an amount larger than 10 parts by weight disadvantageously results in too low a curing rate. In preparing the composition, the method of incorporating the ultraviolet absorber is not particularly limited, but a preferred method is to add the absorber in the form of a solution in component (D).

The composition of the present invention comprises components (A) to (G) as described above and is cured by means of ultraviolet irradiation. Light sources to be used for this purpose are not particularly limited, but a high-pressure mercury lamp is practically suitable.

The ultraviolet-curable silicone resin composition of the present invention can be obtained by uniformly mixing the above-described components (A) to (G) with each other, or uniformly dissolving them in each other, in predetermined proportions. If desired or necessary, various additives may suitably be added to the composition. For example, there may be added additives which are well known in the field of silicones, such as a reinforcing agent, e.g., fumed silica and precipitated silica, a colorant, e.g., an inorganic pigment and an organic dye, a thixotropic agent, an adhesion promotor, and an additive for improving heat resistance. Further, a low-viscosity silicone oil, a cyclic diorganosiloxane and a non-polar organic solvent compatible with silicones may also be suitably added.

The ultraviolet-curable silicone resin composition of the present invention which comprises the above-described components is a transparent liquid before curing and shows excellent stability during the preparation and storage thereof. Further, the composition cures quickly upon exposure to ultraviolet radiation, thus permitting an extremely improved working efficiency, and gives a cured coating which not only is free from bleeding due to its good ultraviolet resistance but also has greatly improved heat resistance and weatherability. Therefore, the composition is extremely suitable for use as a coating composition for optical fibers. The optical fibers covered with cured coatings formed from the composition of this invention show excellent transmission characteristics over a wide temperature range, and are highly reliable for a prolonged period of time because there is no fear of the generation of hydrogen gas or other gases over a long period of time.

The present invention will be explained in more detail by reference to the following Examples, which should not be construed to be limiting the scope of the invention. In the Examples, all parts are by weight.

SYNTHESIS EXAMPLE

Synthesis of Mercaptoalkyl Group-Containing Organopolysiloxane:

Into a four-necked flask equipped with a stirrer, a reflux condenser, a thermometer and a dropping funnel was introduced a mixture of 100 parts of toluene and 90 parts of water. To the mixture, a solution prepared by mixing 19.6 parts (0.1 mol) of 3-mercaptopropyltrimethoxysilane, 82.4 parts (1.2 mol) of dimethyl polysiloxane in which both ends of the molecule had been blocked with a chlorodimethylsiloxy group and which had a viscosity as measured at 25°C. of 10 cP, 2.2 parts (0.02 mol) of trimethylchlorosilane and 45 parts of toluene was added dropwise from the dropping funnel with stirring. After completion of the addition, polymerization was conducted with stirring at 70° C. for 2 hours. After cooling the reaction mixture, the resulting organic layer was separated, and then washed with water repeatedly until the washings became neutral.

The organic layer was introduced into a flask and dehydrated by heating. 0.2 Part of potassium hydroxide was then added thereto, and the resulting mixture was heated for 2 hours under reflux of the toluene, thereby removing the silanol remaining in the polysiloxane. 0.3 Part of ethylene chlorohydrin was added to neutralize the mixture, and the toluene was then distilled off with heating under reduced pressure. After cooling, the resulting liquid was filtered, thereby obtaining a colorless transparent liquid having a viscosity as measured at 25° C. of 1,500 cP. Upon analysis, the liquid was found to be 3-mercaptopropyl group-containing methyl polysiloxane of the formula:

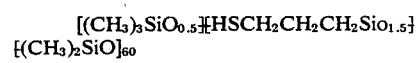

EXAMPLE 1

100 Parts of methylphenylvinyl polysiloxane having a viscosity as measured at 25° C. of 1,000 cP, in which both ends of the molecule had been blocked with a dimethylvinylsilyl group and the molecule excluding the terminal groups consisted of 95 mol % dimethylsiloxane units and 5 mol % diphenylsiloxane units and 100 parts of a 60% toluene solution of a methylvinyl polysiloxane resin comprising $(CH_2=CH)CH_3SiO$ units, $(CH_3)_3SiO_{0.5}$ units and $SiO_2$ units in a ratio of 1:5:8 were mixed with each other to give a uniform solution. Toluene was then distilled off at 110° C. under reduced pressure. 40 Parts of the mercaptopropyl group-containing methyl polysiloxane resin as obtained in Synthesis Example 1 was added thereto, and they were mixed uniformly.

On the other hand, to 5.5 parts of 2-hydroxy-2-methyl-1-phenylpropan-1-one as a photopolymerization initiator were added 0.2 part of p-methoxyphenol and 0.1 part of p-t-butylpyrocatechol as polymerization inhibitors, 0.5 part of tetrakis-[methylene-3-(3,'5'-di-t-butyl-4'-hydroxyphenyl)propionate]methane as an antioxidant, and 0.1 part of 2-(2'-hydroxy-3',5'-di-t-butyl-phenyl)benzotriazole as an ultraviolet absorber, and they were mixed to give a uniform solution. This solution was added to the above-obtained organopolysiloxane, thereby obtaining a transparent composition, i.e., composition 1 (Table).

The thus-obtained composition 1 was poured into a mold at a thickness of 1 mm, and then subjected to ultraviolet radiation for 0.5 second with a 80 W/cm high-pressure mercury lamp placed on the upper side of the composition at a distance of 10 cm from the composition surface, whereby the composition was cured into a transparent silicone rubber elastomer. The physical properties of this silicone rubber were evaluated in accordance with JIS K 6301, and it was found that the hardness was 50, tensile strength 10.2 kgf/cm², and elongation 100%. Further, the Young's modulus of the cured composition did not vary greatly over a temperature range of from −60° C. to 150° C.

The cured sheet as obtained above was subjected to a 24 hour weathering test at 40° C. under 65% RH in a sunshine weatherometer. As a result, no bleeding was observed on the surface of the cured sheet. After the weathering, the physical properties of the cured sheet were evaluated, and it was found that the hardness was 50, tensile strength 10.3 kgf/cm$^2$, elongation 100%, and the weight change due to the weathering was 1%.

Those results show that the cured sheet obtained from composition 1 of Example 1 has good weatherability or ultraviolet resistance.

Meanwhile, the same cured sheet as obtained above was subjected to a 24 hour heat test at 200° C. As a result, no yellowing of the sheet was observed, and the resulting sheet had a hardness of 51, a tensile strength of 9.5 kgf/cm$^2$, an elongation of 95%, and showed a weight loss due to the heating of 1%. Thus, the physical properties had changed a little from the original values, showing good heat resistance.

Further, the same cured sheet as obtained above was immersed in toluene at room temperature for 24 hours, and the weight loss due to the immersion was measured. As a result, the loss was found to be 5.6%, showing that the crosslinking efficiency had been satisfactory.

Furthermore, composition 1 of Example 1 was preserved in a drying oven at 50° C., and the viscosity thereof was measured 1, 3 and 7 days after initiation of the preservation. As a result, the rate of the increase in viscosity was only 10% even after 7 days, showing that the composition of the present invention had good storage stability.

EXAMPLES 2 TO 6

Compositions 2 to 6 were obtained in the same manner as in Example 1 except that the kinds and amounts of raw materials were varied as shown in the Table below. Those compositions and cured elastomers obtained therefrom were evaluated in the same manner as in Example 1. As a result, satisfactory results were obtained. The results obtained are shown in the Table below.

COMPARATIVE EXAMPLES 1 TO 6

Comparative compositions 1 to 6 were obtained in the same manner as in Example 1 except that the kinds and amounts of raw materials were varied as shown in the Table below. Those compositions and cured elastomers obtained therefrom were evaluated in the same manner as in Example 1. The results obtained are shown in the Table below.

Although the difference in the properties shown in the Table between Comparative Example 4 and Example 1 is not great, it should be noted that when the storage stability of comparative composition 4 was examined at a temperature of 50° C., the composition gelled in 2 days. The compositions of the other Comparative Examples were all inferior to the compositions of the Example in curing properties or properties of cured elastomers, as is clearly shown by the sign X for each of those Comparative Examples.

TABLE

| Composition (parts): | | Example | | | | | | Comparative Example | | | | | |
|---|---|---|---|---|---|---|---|---|---|---|---|---|---|
| | | 1 | 2 | 3 | 4 | 5 | 6 | 1 | 2 | 3 | 4 | 5 | 6 |
| Methylphenylvinyl polysiloxane | | 100 | 100 | 100 | 100 | 100 | 100 | 100 | 100 | 100 | 100 | 100 | 100 |
| Methylvinyl polysiloxane resin | | 60 | 60 | 60 | 60 | 60 | 60 | 60 | — | 60 | 60 | 60 | 60 |
| Mercaptopropyl-containing methyl polysiloxane resin | | 40 | 40 | 40 | 40 | 40 | 40 | — | 40 | 40 | 40 | 40 | 40 |
| Photopolymerization initiator: | 2-Hydroxy-2-methyl-1-phenylpropan-1-one | 5.5 | — | 3.0 | 5.5 | 5.5 | 5.5 | 5.5 | 5.5 | — | 5.5 | 5.5 | 5.5 |
| | 1-(4-Isopropylphenyl)-2-hydroxy-2-methylpropan-1-one | — | 5.5 | — | — | — | — | — | — | — | — | — | — |
| | t-Butyl perbenzoate | — | — | 3.0 | — | — | — | — | — | — | — | — | — |
| Polymerization inhibitor: | p-Methoxyphenol | 0.2 | 0.2 | 0.2 | 0.3 | 0.2 | 0.2 | 0.2 | 0.2 | 0.2 | — | 0.2 | 0.2 |
| | p-t-Butylpyrocatechol | 0.1 | 0.1 | 0.1 | — | 0.1 | 0.1 | 0.1 | 0.1 | 0.1 | — | 0.1 | 0.1 |
| Antioxidant: | Tetrakis-[methylene-3-(3',5'-di-t-butyl-4'-hydroxyphenyl)propionate]methane | 0.5 | 0.5 | 0.5 | — | 0.5 | 0.5 | 0.5 | 0.5 | 0.5 | 0.5 | — | 0.5 |
| | 2,6-di-t-Butyl-p-cresol | — | — | — | 0.5 | — | — | — | — | — | — | — | — |
| Ultraviolet absorber: | 2-(2'-Hydroxy-3',5'-di-t-butylphenyl)-benzotriazole | 0.1 | 0.1 | 0.1 | 0.1 | — | — | 0.1 | 0.1 | 0.1 | 0.1 | 0.1 | — |
| | 2-Hydroxy-4-octoxybenzophenone | — | — | — | — | 0.1 | — | — | — | — | — | — | — |
| | p-t-Butylphenyl salicylate | — | — | — | — | — | 0.1 | — | — | — | — | — | — |
| Ultraviolet-curing properties (80 W, 0.5 sec) | | O | O | O | O | O | O | x | Δ | x | O | O | O |
| Ultraviolet resistance (weatherometer, 40° C., 65% RH, 24 hrs) | | O | O | O | O | O | O | — | Δ | — | O | O | x |
| Heat resistance (200° C., 24 hrs) | | O | O | Δ | O | O | O | — | Δ | — | O | x | O |
| Crosslinking efficiency | | O | O | O | O | O | O | — | x | — | O | O | O |

O: Good, or 80% or higher retention
Δ: Slightly good, or 50 to 80% retention
x: Poor, or below 50% retention

EXAMPLE 7

A composition was prepared in the same manner as in Example 1 except that in place of the methylphenylvinyl polysiloxane in Example 1, methylvinyl polysiloxane having a viscosity as measured at 25° C. of 3,000 cP, in which both ends of the molecule had been blocked with a dimethylvinylsilyl group and the molecule, excluding the terminal groups consisting of 99.6 mol % dimethylsiloxane units and 0.4 mol % methylvinylsiloxane units was used. This composition and a cured elastomer obtained therefrom were evaluated in the same manner as in Example 1. As a result, satisfactory results were obtained with respect to each of the tests. That is, the results of the curing properties, storage stability, heat resistance, ultraviolet resistance and crosslinking efficiency were substantially the same as those in Example 1.

EXAMPLE 8

A composition was prepared in the same manner as in Example 7 except that in place of the methylvinyl polysiloxane resin in Example 7, a methylvinyl polysiloxane resin consisting of $(CH_2=CH)CH_3SiO$ units, $(CH_3)_3SiO_{0.5}$ units and $SiO_2$ units in a numerical ratio of 1:2:4 was used. The thus obtained composition and a cured elastomer obtained therefrom were evaluated in the same manner as in Example 1, and the same results as those of Example 7 were obtained.

EXAMPLE 9

The same procedures as in Example 1 were repeated except that a polysiloxane of the formula:

$(CH_3)_2SiO]_{50}$ was used in place of the mercaptopropyl group-containing methyl polysiloxane resin in Example 1. The results obtained were the same as those in Example 1.

COMPARATIVE EXAMPLE 7

The same procedures as in Example 1 were repeated except that a mercaptopropyl group-containing methyl polysiloxane resin of the formula:

was used in place of that in Example 1.

The sheet obtained through ultraviolet curing had a hardness of 20, a tensile strength of 4 kgf/cm², and an elongation of 110%, but the sheet which had been subjected to a 24 hour 200° C. heat treatment had a hardness of 12, a tensile strength of 1 kgf/cm², and an elongation of 20%, and showed a weight loss due to the heating of 15%. Further, after the weathering test, bleeding was clearly observed on the surface of the sheet, and the resulting sheet had a hardness of 35, a tensile strength of 5 kgf/cm², an elongation of 20%, and showed a weight loss due to the weathering of 17%.

While the invention has been described in detail and with reference to specific embodiments thereof, it will be apparent to one skilled in the art that various changes and modifications can be made therein without departing from the spirit and scope thereof.

What is claimed is:

1. An ultraviolet-curable silicone resin composition for use in coating optical fibers, which comprises
   (A) 100 parts by weight of a vinyl group-containing flowable organopolysiloxane represented by the average composition formula,

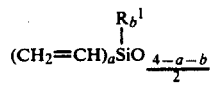

wherein $R^1$ represents a substituted or unsubstituted monovalent hydrocarbon group excluding a vinyl group, and a and b are numbers defined by the formulae $0.01 \leq a \leq 1$, $0.8 \leq b \leq 3$ and $1.8 \leq a+b \leq 2.2$, and having a viscosity as measured at 25° C. of from 50 to 10,000 cP;
   (B) 30 to 300 parts by weight of a vinyl group-containing organopolysiloxane resin comprising units represented by $R^2{}_3SiO_{0.5}$, units represented by $(CH_2=CH)_cR^3{}_{2-c}SiO$ wherein $R^2$ and $R^3$ each independently represents a substituted or unsubstituted monovalent hydrocarbon group excluding a vinyl group, and c is 0, 1 or 2, and units represented by $SiO_2$, the molar ratio of the sum of the $R^2{}_3SiO_{0.5}$ units and the $SiO_2$ units to the $(CH_2=CH)_cR^3{}_{2-c}SiO$ units being in the range of from 3 to 20, the content of a vinyl group in component (B) being 1 to 25 mol %;
   (C) 10 to 100 parts by weight of a mercaptoalkyl group-containing organosiloxane comprising units represented by $R^2{}_3SiO_{0.5}$, units represented by

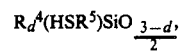

and units represented by $R^6{}_{2-e}R^7{}_eSiO$ wherein $R^2$, $R^4$, $R^6$ and $R^7$ each independently represents a substituted or unsubstituted monovalent hydrocarbon group having 2 to 6 carbon atoms, d is 0, 1 or 2, and e is 0, 1 or 2, the molar ratio of the sum of $R^2{}_3SiO_{0.5}$ units and the

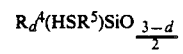

units to the $R^6{}_{2-e}R^7{}_eSiO$ units being in the range of from 0.05 to 0.5, the content of an SH group in component (C) being 4 to 30 mol %;
   (D) 0.01 to 50 parts by weight of a photopolymerization initiator;
   (E) 0.001 to 10 parts by weight of a polymerization inhibitor;
   (F) 0.001 to 10 parts by weight of an antioxidant; and
   (G) 0.001 to 10 parts by weight of an ultraviolet absorber,
   the molar ratio of the mercaptoalkyl groups in component (C) to the vinyl groups in both components (A) and (B) being in the range of from 0.2 to 2.5, wherein said ultraviolet absorber (G) is selected from the group consisting of salicylic acid ultraviolet absorbers, 2,4-dihydroxybenzophenone, 2-hydroxy-4-methoxybenzophenone, 2-hydroxy-4-octoxybenzophenone and 2,2'-dihydroxy-4,4'-dimethoxybenzophenone ultraviolet, benzotriazole ultraviolet absorbers and cyanoacrylate ultraviolet absorbers.

2. A composition as claimed in claim 1, wherein 1 to 10% of all the monovalent hydrocarbon groups in component (A) are phenyl.

3. A composition as claimed in claim 1, wherein said photopolymerization intiator, component (D), is 2-hydroxy-2-methyl-1-phenylpropan-1-one.

4. A composition as claimed in claim 1, wherein said antioxidant, component (F), is tetrakis-methane.

5. A composition as claimed in claim 1, wherein component (G) is a benzophenone ultraviolet absorber selected from the group consisting of 2,4-dihydroxybenzophenone, 2-hydroxy-4-methoxybenzophenone, 2-hydroxy-4-octoxybenzophenone and 2,2'-dihydroxy-4,4'-dimethoxybenzophenone.

6. A composition as claimed in claim 1, wherein component (G) is a benzotriazole-type ultraviolet absorber.

7. A composition as claimed in claim 1 wherein in the formula

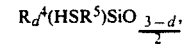

d is 0.

8. A composition as claimed in claim 1, wherein the ultraviolet absorber is selected from the group consisting of phenyl salicylate, p-t-butylphenyl salicylate, p- octylphenyl salicylate, 2,4-dihydroxybenzophenone, 2-hydroxy-4-methoxybenzophenone, 2-hydroxy-4-octoxybenzophenone, 2,2'-dihydroxy-4,4'-dimethoxybenzophenone, 2-(2'-hydroxy-5'-methylphenyl)benzotriazole, 2-(2'-hydroxy-5'-t-butylphenyl)benzotriazole, 2-(2'-hydroxy-3',5'-di-t-butylphenyl)benzotriazole, 2-(2'-hydroxy-3'5'-di-t-butylphenyl)-5-chlorobenzotriazole, 2-ethylhexyl-2-cyano-3,3'-diphenylacrylate and ethyl-2-cyano-3,3'-diphenylacrylate.

* * * * *